United States Patent
Sasano

[11] Patent Number: 5,605,656
[45] Date of Patent: Feb. 25, 1997

[54] LIQUID FILLING METHOD AND LENS MANUFACTURING METHOD

[75] Inventor: Masami Sasano, Sagamihara, Japan

[73] Assignee: Hoya Corporation, Tokyo, Japan

[21] Appl. No.: 433,486

[22] PCT Filed: Sep. 16, 1994

[86] PCT No.: PCT/JP94/01532

§ 371 Date: May 12, 1995

§ 102(e) Date: May 12, 1995

[87] PCT Pub. No.: WO95/08754

PCT Pub. Date: Mar. 30, 1995

[30] Foreign Application Priority Data

Sep. 22, 1993 [JP] Japan .................................. 5-257513

[51] Int. Cl.⁶ .................................................. B29D 11/00
[52] U.S. Cl. .......................... 264/1.1; 73/295; 73/304 R; 264/40.4; 425/147; 425/808
[58] Field of Search ................................. 73/295, 304 R; 264/1.1, 40.4; 425/147, 808; 141/102, 21, 13

[56] References Cited

U.S. PATENT DOCUMENTS 3,562,546  2/1971  Kraemer ........................... 73/295
4,157,037  6/1979  Ross ................................. 73/304 R
4,583,401  4/1986  Schlindwein et al. ............ 73/295
4,594,064  6/1986  Anderson ......................... 425/147
4,956,134  9/1990  Luc .................................. 425/147

FOREIGN PATENT DOCUMENTS

54-83465    7/1979   Japan .
54-118330   9/1979   Japan .
55-123430   9/1980   Japan .
56-144939   11/1981  Japan ............................. 264/40.4
59-148826   8/1984   Japan ............................. 73/295
63-274517   11/1988  Japan .

Primary Examiner—Mathieu D. Vargot
Attorney, Agent, or Firm—Armstrong, Westerman, Hattori, McLeland & Naughton

[57] ABSTRACT

A liquid filling method and in particular a lens material liquid filling method suitable for manufacturing a plastic lens. A thermal sensing portion (2a) of a temperature sensor (2) is set and kept to a temperature different from that of a liquid (3). The liquid (3) is poured into a vessel (8), a change of an output from the temperature sensor (2) is detected when the surface of the liquid (3) comes into contact with the thermal sensing portion (2a) by temperature detecting means (5), and control means (6) determines that the liquid surface has reached a desired level and sends a pouring stop command to a pouring mechanism (7) to complete the filling of the liquid.

8 Claims, 8 Drawing Sheets

LIQUID FILLING METHOD AND LENS MANUFACTURING METHOD

TECHNICAL FIELD

The present invention relates to a liquid filling method and a lens manufacturing method, and more specifically, to a liquid filling method of filling a vessel with a lens material liquid and a lens manufacturing method using the liquid filling method.

BACKGROUND ART

A plastic lens is manufactured in such a manner that a cavity is formed between a casting gasket and upper and lower molds, and plastic monomer as a lens material is filled into the cavity and polymerized.

At that time, the plastic monomer must be filled thereinto in an accurate amount. The following methods are conventionally employed as a method which provides accurate filling of the material.

As a first method, the cubic content of a cavity is previously measured and an amount of a liquid corresponding to the cubic content is filled into the cavity.

As a second method, the liquid level is detected in a non-contact manner using a capacitive sensor so as to accurately control an amount to be filled.

As a third method, after a liquid is filled into a vessel, the liquid overflowing from the vessel is absorbed in vacuum so as to detect the filling of the liquid by making use of a pressure difference in a vacuum circuit between a pressure when a gas is absorbed before the liquid overflows and a pressure when the overflown liquid is absorbed, as shown in Japanese Laid-Open Patent Publication No. Hei 4(1992)-128617.

However, according to the first method, when the inside volumes of cavities have dispersion or when an amount of a liquid to be filled thereinto cannot be accurately controlled, the liquid overflows from the cavity or the cavity is insufficiently filled conversely and bubbles remain in the cavity.

According to the second method, it is difficult to miniaturize the capacitive sensor and it is therefore difficult to obtain a capacitive sensor applicable to a lens making cavity. Moreover, it is inherently difficult to improve the accuracy of the capacitive sensor.

Further, according to the third method, a vessel can be filled with a liquid with a high accuracy regardless of a type of a liquid, a shape of a cavity, and the dispersion of the inside volumes of cavities. On the other hand, in the third method, an absorbing pressure must be accurately adjusted. Further, when a liquid having a high polymerizing speed is absorbed, an absorbing pipe is clogged.

DISCLOSURE OF THE INVENTION

Taking the above into consideration, an object of the present invention is to provide a liquid filling method capable of accurately filling a liquid without being affected by the material of the liquid to be poured and the dispersion of the volumes of vessels.

Another object of the present invention is to provide a lens material liquid filling method capable of accurately filling a lens material liquid without being affected by the type of the lens material liquid and the dispersion of the volumes of cavities.

A further object of the present invention is to provide a lens manufacturing method capable of manufacturing a high quality lens by accurately filling a lens material into a cavity.

To accomplish the above objects, according to the present invention, there is provided a liquid filling method of controlling an amount of a liquid to be filled into a vessel, comprising the steps of setting and keeping a thermal sensing portion of a temperature sensor to a temperature different from that of the liquid, pouring the liquid into the vessel, detecting a change of an output from the temperature sensor when the surface of the liquid comes into contact with the thermal sensing portion and stopping the filling of the liquid when it is determined that the liquid surface has reached a desired level.

There is also provided a lens material liquid filling method of controlling an amount of a lens material liquid to be filled into a cavity, comprising the steps of setting and keeping a thermal sensing portion of a temperature sensor to a temperature different from that of the lens material liquid, pouring the lens material liquid into a vessel, detecting a change of an output from the temperature sensor when the surface of the lens material liquid comes into contact with the thermal sensing portion, and stopping the filling of the lens material liquid when it is determined that the liquid surface has reached a desired level.

Further, there is provided a method of manufacturing a lens by pouring a lens material liquid into a cavity, comprising the steps of forming a cavity in a casting gasket to which two molds are attached, setting and keeping a thermal sensing portion of a temperature sensor to a temperature different from that of the lens material liquid and disposing the thermal sensing portion on a filling surface, pouring the lens material liquid into a vessel, detecting a change of an output from the temperature sensor when the surface of the lens material liquid comes into contact with the thermal sensing portion, stopping the filling of the lens material liquid when it is determined that the liquid surface has reached a desired level and putting the gasket filled with the liquid into a polymerizer and polymerizing the lens material liquid in the polymerizer.

BRIEF DESCRIPTION OF THE DRAWINGS

FIGS. 5(A) and 5(B) are views showing pouring states of a plastic material, wherein

BEST MODE OF CARRYING OUT THE INVENTION

An embodiment of the present invention will be described below with reference to the drawings.

Figure 1:
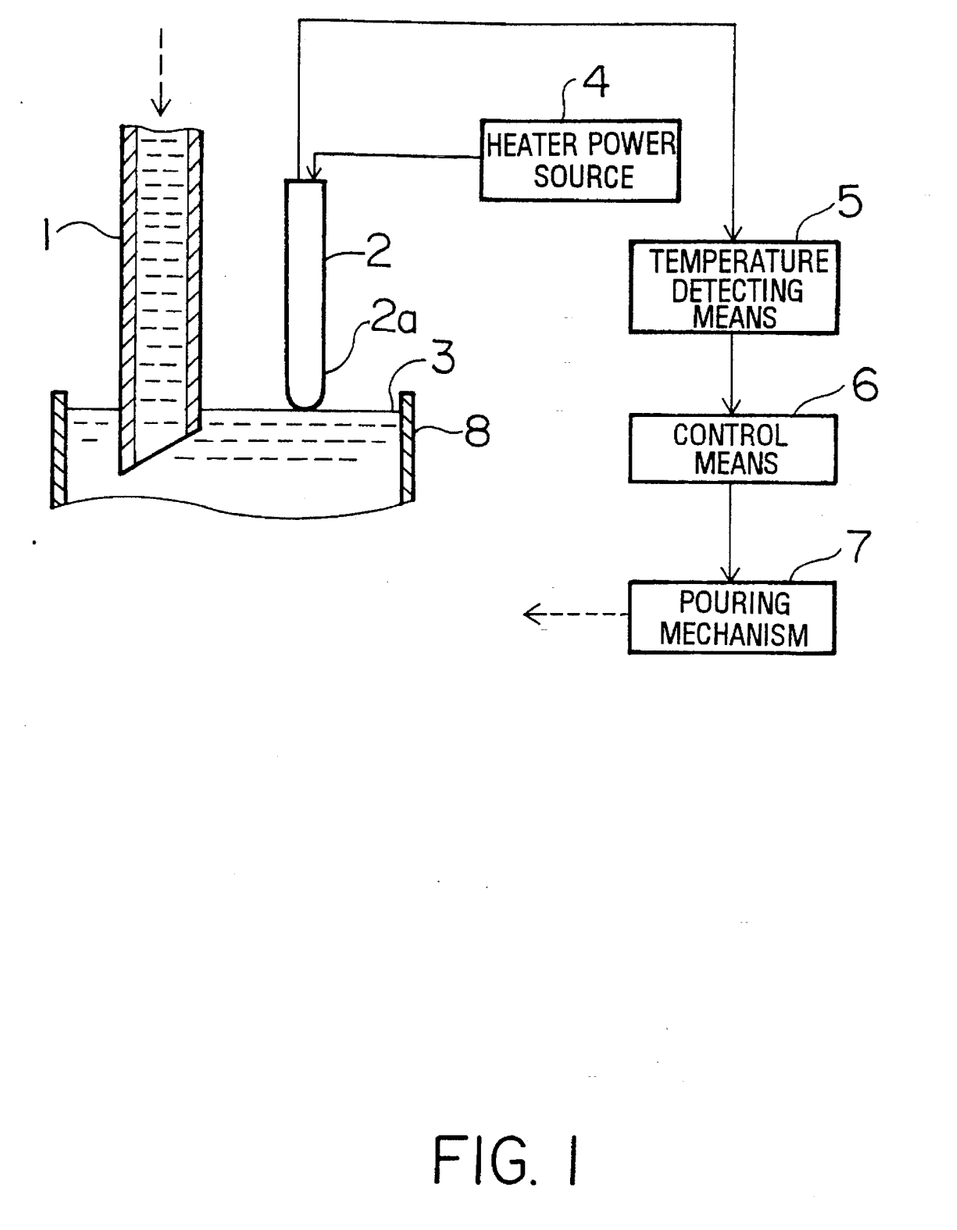
FIG. 1 is a conceptual view of a lens material liquid filling apparatus embodying a lens material liquid filling method of the present invention.

FIG. 1 is a conceptual view of a lens material liquid filling apparatus embodying a lens material liquid filling method of the present invention.

A lens material liquid 3 (monomers to form polyurethane) is poured into a vessel 8 from a pouring nozzle 1. A temperature sensor 2 is disposed such that a tip 2a thereof coincides with a target level of the lens material liquid 3. An electric current is supplied to the temperature sensor 2 from a heater power source 4 so that the temperature sensor 2 is kept at a temperature set higher than that of the lens material liquid 3 (lens material liquid: about 5° C., temperature sensor: about 70° C.). The temperature sensor 2 always detects a temperature of its tip 2a and outputs a voltage signal corresponding to a detected temperature.

Temperature detecting means 5 detects a present temperature based on the voltage signal from the temperature sensor 2 and supplies the temperature to control means 6. While the temperature of the temperature sensor 2 is kept at the set temperature, the control means 6 controls a pouring mechanism 7 to pour the lens material liquid 3 from the pouring nozzle 1 into the vessel. When the lens material liquid 3 is filled up to the target level and comes into contact with the tip 2a of the temperature sensor 2, a temperature detected by the temperature sensor 2 is lowered. On detecting it, the control means 6 stops the operation of the pouring mechanism 7 and stops pouring the lens material liquid 3. Thus, the pouring and filling of the lens material liquid 3 are finished.

Figure 2:
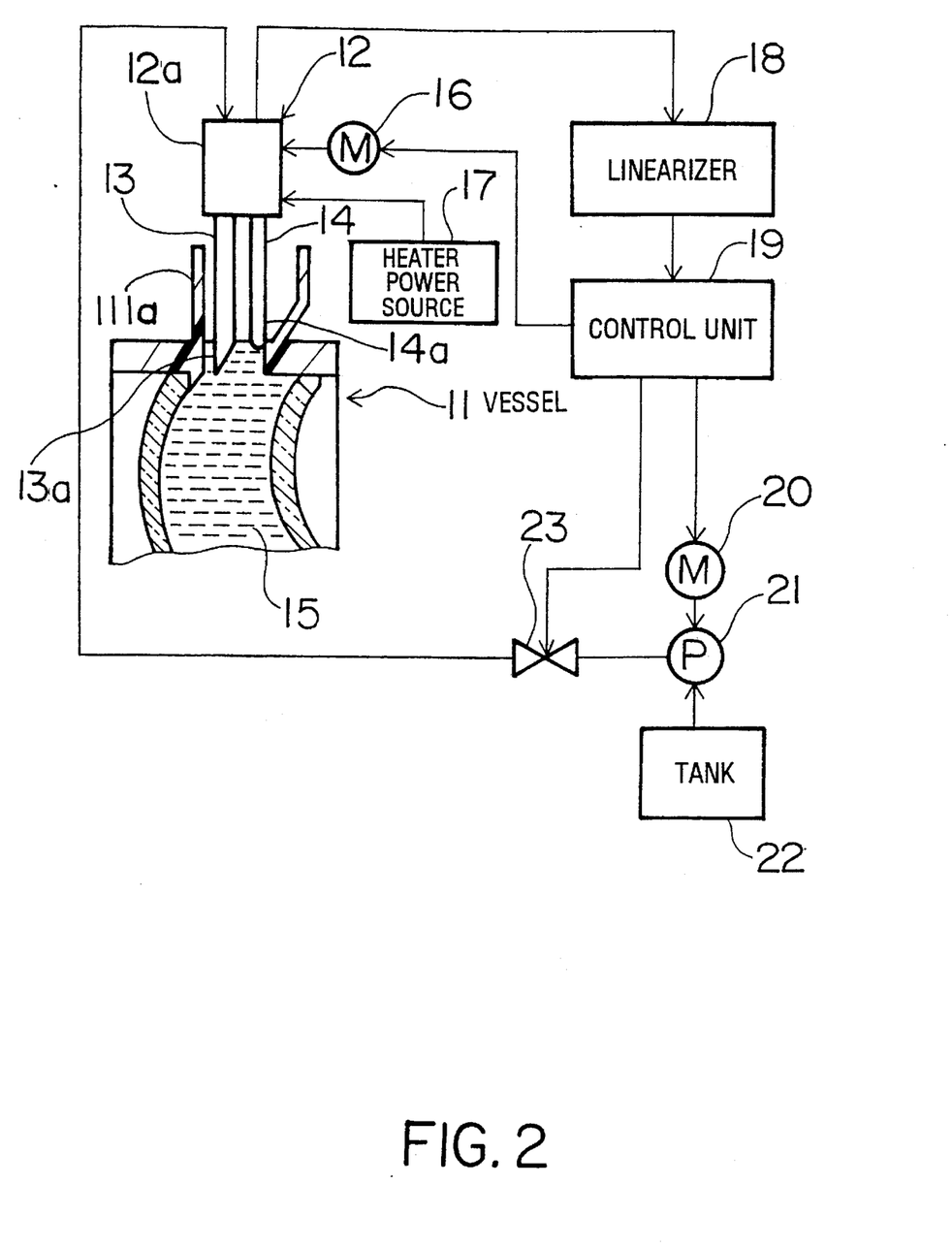
FIG. 2 is a view showing a specific arrangement of the lens material liquid filling apparatus.

FIG. 2 is a view showing a specific arrangement of the lens material liquid filling apparatus. A pouring nozzle 13 and a temperature sensor 14 of a pouring/sensing unit 12 are inserted into a pouring port 111a of a vessel 11. The pouring nozzle 13 and temperature sensor 14 are both fixed to a main body 12a so that the tip 14a as the thermal sensing portion thereof is positioned at a location a little higher than the tip 13a of the pouring nozzle 13. Further, the pouring nozzle 13 and temperature sensor 14 are disposed so that they are not in contact with each other.

The pouring nozzle 13 is a nozzle for pouring a plastic material 15 as the lens material liquid into the vessel 11. The plastic material 15 is monomer and is specifically among monomers of methyl methacrylate, a mixture of monomers of methyl methacrylate and at least one kind of other monomer, monomers of diethylene glycol bis allyl carbonate, a mixture of monomers of diethylene glycol bis allyl carbonate and at least one kind of other monomer, monomers containing sulfur, monomers containing halogen, or monomers to form the following polymers: polycarbonate, polystyrene, polyvinyl chloride, unsaturated polyester, polyethylene terephthalate, polyurethane, and the like. Note, the polyurethane group referred to here is produced by the reaction of a polyisocyanate compound, polythiol compound, and polyol compound and includes, for example, a mixture of monomers of m-xylene diisocyanate and pentaerythritol tetrakis propionate.

On the other hand, as described later, the temperature sensor 14 is always kept at a temperature higher than that of the plastic material 15 by an electric current supplied thereto from a heater power source 17. A temperature of the plastic material 15 is set to, for example, −10° C. to 20° C. (preferably a low temperature of −5° C. to 10° C.) and a temperature of the temperature sensor 14 is set to, for example, about 30° C. to 90° C. and a temperature difference therebetween is preferably as large as possible (preferably 50° C. or larger). Further, the temperature sensor 14 detects a temperature at a given moment of its tip 14a and supplies a voltage signal corresponding to the temperature detected thereby to a linearizer 18.

The pouring/sensing unit 12 having the pouring nozzle 13 and temperature sensor 14 is moved upward and downward by a motor 16.

The linearizer 18 linearizes and amplifies the voltage signals from the temperature sensor 14 at intervals of about 0.1 second, detects the temperature of the temperature sensor 14, and supplies the detected signal to a control unit 19. The control unit 19, which is composed of a sequencer, personal computer or the like, controls the motor 16, a motor 20 and a valve 23 based on the detected signal from the linearizer 18 as described later. Further, the control unit 19 also controls other units not shown such as a transfer unit and the like.

The motor 20 controls the operation of a pump 21. The pump 21 pumps up the plastic material 15 in a tank 22 and supplies the same to the pouring nozzle 13 through the valve 23.

Figure 3:
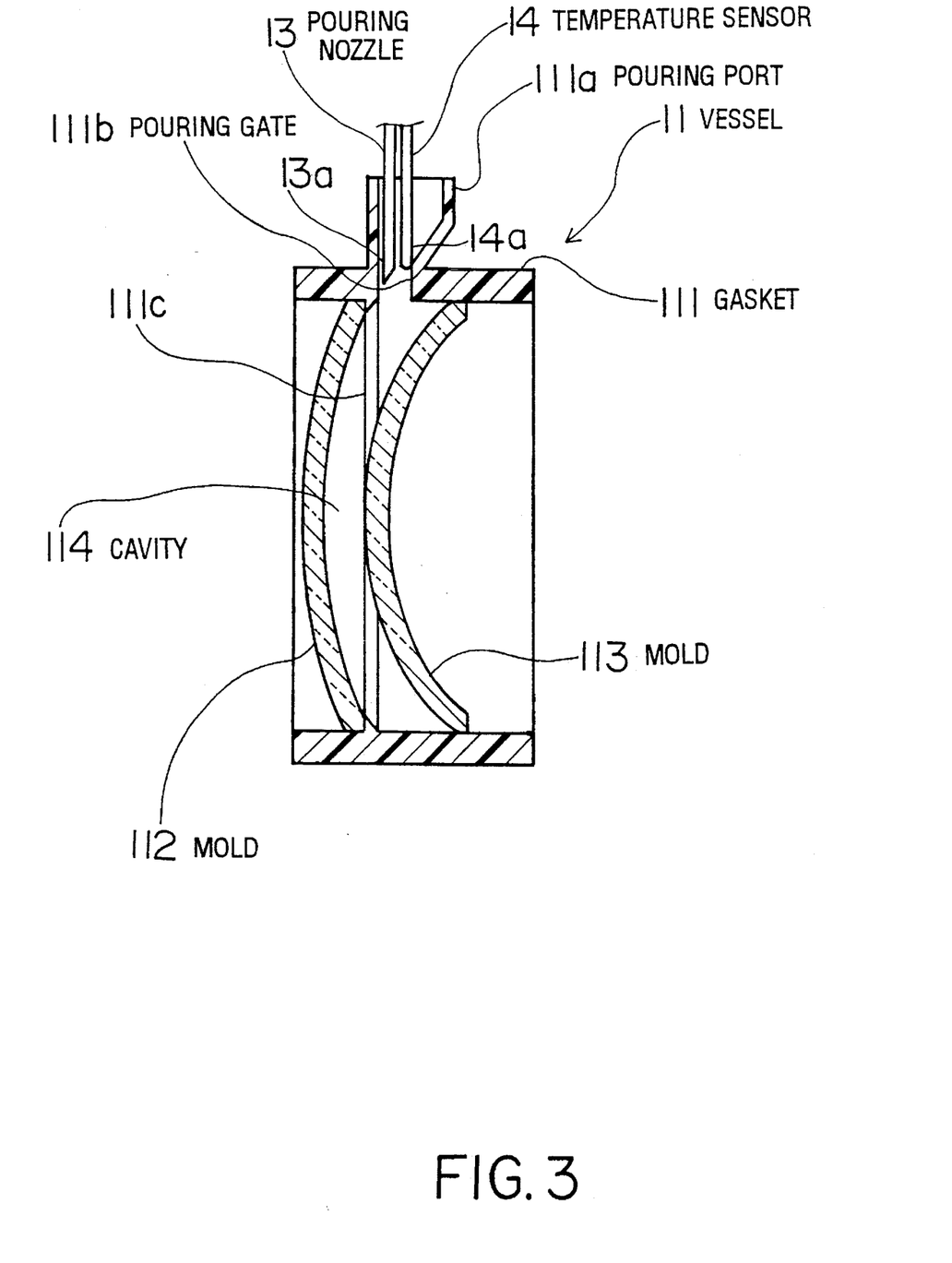
FIG. 3 is a cross sectional view showing a specific arrangement of a vessel.

FIG. 3 is a cross sectional view showing a specific arrangement of the vessel 11. The vessel 11 is mostly composed of a gasket 111 formed to a substantially cylindrical shape and two molds 112 and 113. The gasket 111 is composed of elastic polyolefin elastomer. In addition to the polyolefin elastomer, ethylene acetate vinyl copolymer, polyethylene, polyethylacrylate, vinyl chloride and the like, for example, may be arbitrarily selected as resin to be used for the gasket 111 in accordance with its application.

The cylindrical gasket 111 is used in the state that it is horizontally laid. A pouring gate 111b is formed substantially at the center of the upper portion of the gasket 111. The pouring gate 111b is formed to such a size as to enable the tip 13a of the pouring nozzle 13 to be inserted into the gate. Further, the gasket 111 has a pouring port 111a formed in a shape expanding upwards from the pouring gate 111b. The pouring port 111a is formed to such a size as to enable the respective tips 13a, 14a of the pouring nozzle 13 and temperature sensor 14 to be inserted into the port.

A ring-shaped projection band 111c is formed on the circumference of the inner wall of the gasket 111 in the vicinity of the pouring port 111a. The two molds 112 and 113 are disposed in the gasket 111. Each of the molds 112, 113 has a diameter slightly larger than the inside diameter of the gasket 111 so that the molds can slide in the gasket 111 with a suitable friction force. The mold 112 is inserted into the gasket 111 from the left side in FIG. 3, and the mold 113 is inserted into the gasket 111 from the right side in FIG. 3.

When the mold 112 is inserted into the gasket 111, it is abutted against the ring-shaped projection band 111c and held at the position. On the other hand, the insertion of the mold 113 is stopped at a position where a distance between the molds 113 and 112 is set to a target lens thickness, and the mold 13 is held in this state. When the molds 112 and 113 are inserted into the gasket 111 as described above, a cavity 114 into which the plastic material 15 is to be poured is formed by the gasket 111 and the molds 112 and 113.

Figure 4:
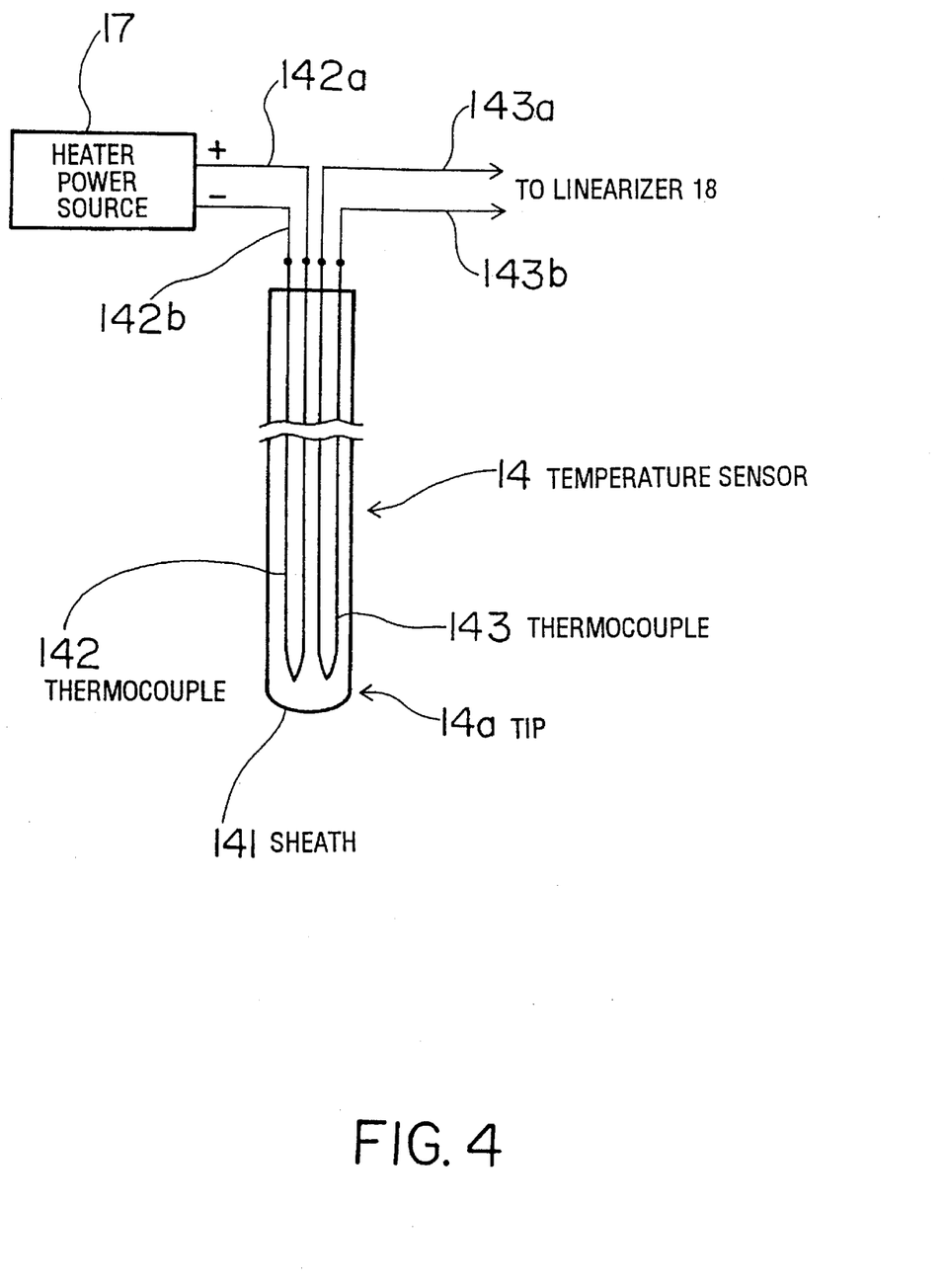
FIG. 4 is a view showing an arrangement of a temperature sensor.

FIG. 4 is a view showing an arrangement of the temperature sensor 14. The temperature sensor 14 is composed of two thermocouples 142, 143 disposed in a stainless sheath 141. The thermocouples 142 and 143 are CA (symbol defined by JIS) thermocouples composed of chromel and alumel. The thermocouple 142 is used as a heater. More specifically, terminals 142a, 142b of the thermocouple 142 are connected to the output terminals of the heater power source 17 and kept at a predetermined temperature by an electric current supplied from the heater power source 17. Further, the other thermocouple 143 is used as a thermal sensing portion. That is, terminals 143a and 143b of the thermocouple 143 are connected to the linearizer 18 shown in FIG. 2 and supplies a voltage signal corresponding to a temperature detected by the tip 14a to the linearizer 18.

Note, a platinum resistance thermometer, thermistor or the like may be used as the thermal sensing portion of the temperature sensor 14 in addition to the thermocouple. However, a stainless tube, same as the sheath 141, is preferable as a protection tube of the sensor. Stainless is suitable for use with polyurethane, allylic and acrylic monomers and, since stainless does not react with these monomers, it can prevent the solidification of the monomers. A commercially available temperature sensor having a spare thermocouple can be used as it is as the temperature sensor 14.

Next, operation of the above lens material liquid filling apparatus will be described below with reference to FIG. 2–FIG. 6.

First, as shown in FIG. 3, the cavity 114 is formed between the gasket 111 and the molds 12 and 13. The vessel 11 is located by a positioning device not shown so that the pouring gate 111b is located at a predetermined position. Next, the motor 16 shown in FIG. 2 is driven so that the pouring/sensing unit 12 is lowered from an original position and located at a first pouring position.

Figure 5A:
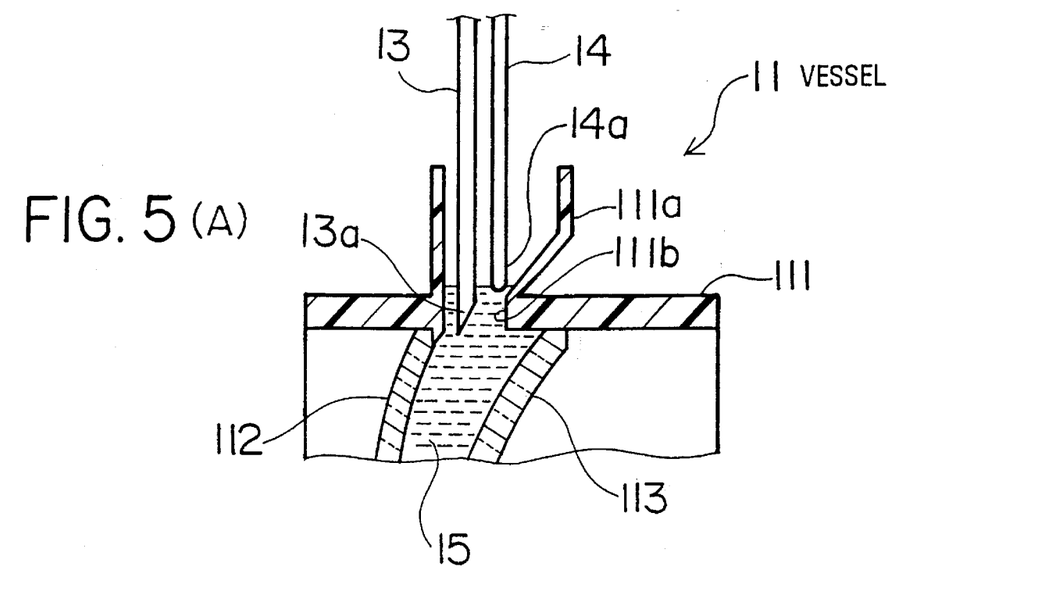
FIG. 5(A) shows the pouring state at a first pouring position and FIG. 5(B) shows the pouring state at a second pouring position.
Figure 5B:
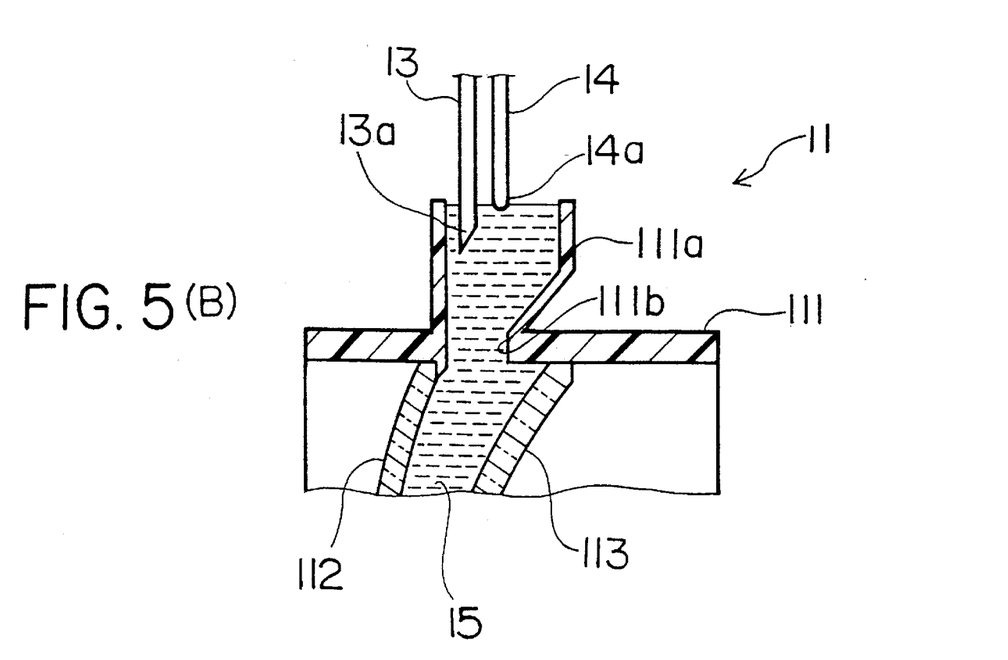

FIGS. 5(A) and 5(B) are views showing pouring states of the plastic material 15, wherein FIG. 5(A) shows the pouring state at the first pouring position and FIG. 5(B) shows the pouring state at a second pouring position. As shown in FIG. 5(A), a portion of the tip of the pouring nozzle 13 is inserted into the pouring gate 111b and the tip 14a of the temperature sensor 14 is located on the inlet surface of the pouring gate 111b at the first pouring position. When the valve 23 is opened and the motor 20 is driven in this state, the plastic material 15 in the tank 22 is poured into the cavity 114 through the pouring nozzle 13 by the action of the pump 21. At that time, a pouring rate is suitably regulated so that any bubble is not produced in the cavity 114. Further, a heater current is supplied from the heater power source 17 to the temperature sensor 14.

When the plastic material 15 is poured into the cavity 114 from the pouring nozzle 13 and the liquid level reaches the first pouring position (lens cavity filling position), the plastic material 15 comes into contact with the tip 14a of the temperature sensor 14 (FIG. 5(A)). Then, the tip 14a of the temperature sensor 14 is cooled by the plastic material 15, whereby the output value of a voltage signal from the temperature sensor 14 quickly drops.

Figure 6:
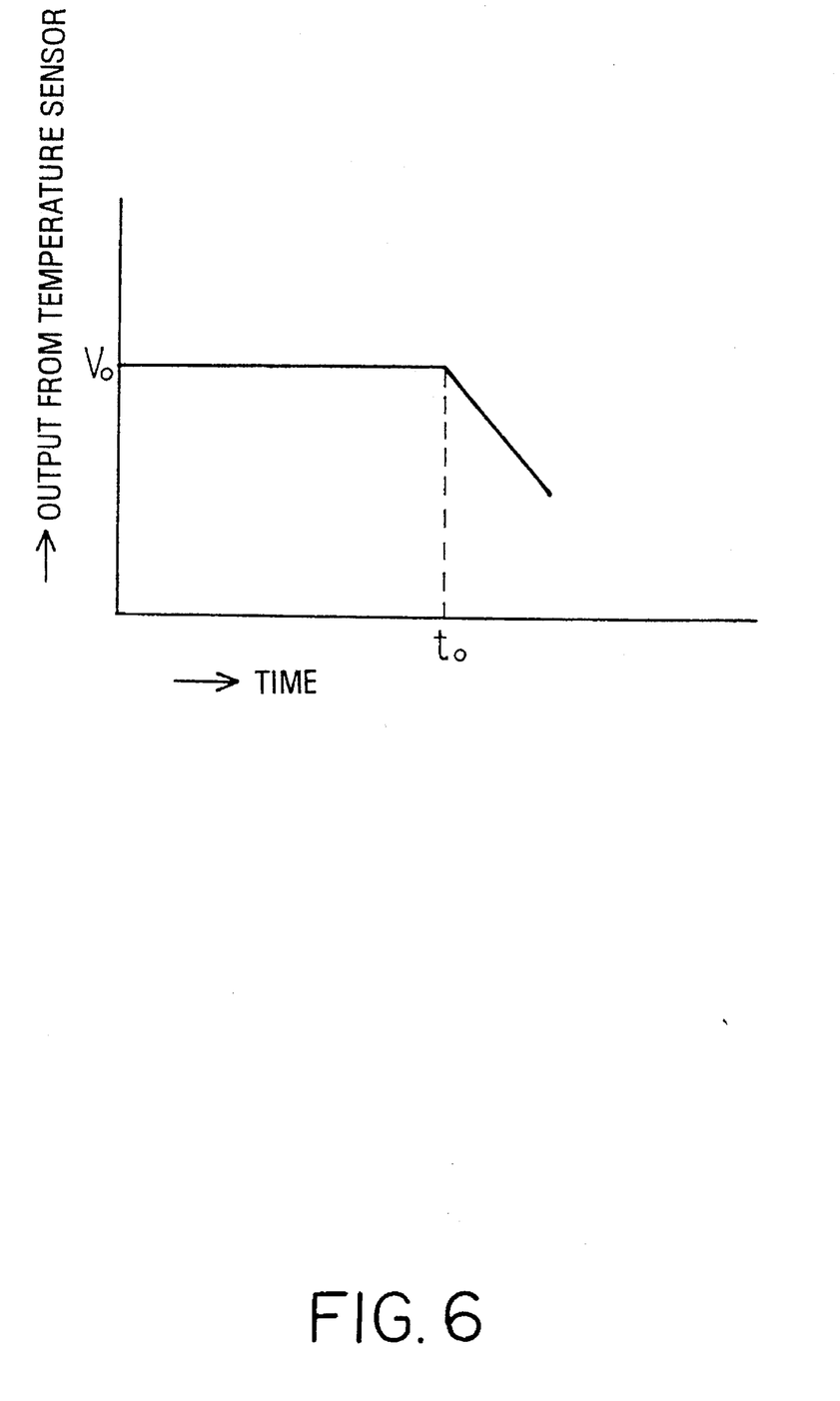
FIG. 6 is a graph showing an output profile of a temperature sensor.

FIG. 6 is a graph showing output characteristics of the temperature sensor 14. An output value from the temperature sensor 14 is kept to a predetermined value $V_0$ in a steady state as shown in FIG. 6. When the tip 14a of the temperature sensor 14 comes into contact with the plastic material 15 (at a time $t_0$), the tip 14a of the temperature sensor 14 is cooled and an output value from the temperature sensor 14 quickly drops. The control unit 19 detects that the tip 14a of the temperature sensor 14 has sensed the liquid level of the plastic material 15 by detecting the quick drop of the output value.

When the plastic material 15 is filled up to the first pouring position as described above, the valve 23 is closed and the operation of the motor 20 is stopped at once, and the pouring of the plastic material 15 is stopped. Next, the motor 16 is driven so that the pouring/sensing unit 12 is lifted and located at the second pouring position (entire cavity filling position). At the second pouring position, a portion of the tip of the pouring nozzle 13 is inserted into the inlet of the pouring port 111a and the tip of the temperature sensor 14 is located on the inlet surface of the pouring port 111a. The valve 23 is opened again and the motor 20 is driven in this state so that the plastic material 15 is poured into the pouring port 111a from the pouring nozzle 13. At that time, the plastic material 15 is poured at a slow speed different from that employed to pour the plastic material 15 to the first pouring position and the pouring speed is regulated by taking into consideration the suppression of bubbles produced in the pouring port 111a and the inflow of the remaining plastic material 15 after the pouring operation is stopped.

When the plastic material 15 is poured into the cavity 114 and the liquid level reaches the second pouring position, the plastic material 15 comes into contact with the tip 14a of the temperature sensor 14, whereby the tip 14a of the temperature sensor 14 is cooled by the plastic material 15 and the output value of a voltage signal from the temperature sensor 14 thermal sensing drops in the same way as above. When the control unit 19 detected the drop, it closes the valve 23 and stops the motor 23 at once in order to stop the pouring of the plastic material 15. With this operation, the pouring of the plastic material 15 into the vessel 11 is completed. On the completion of the pouring, the pouring/sensing unit 12 is lifted and returned to the original position to wait for the transfer of the next vessel.

A seal is applied to the pouring port 111a of the vessel 11 filled with the plastic material 15 so as to prevent the invasion of foreign substances or air into the vessel 11. Then, the vessel 11 is transferred to a polymerizer to make the plastic material therein heated and polymerized in the range of 20° C.–120° C. for 24 hours. With this treatment, the plastic material 15 in the cavity 114 is solidified and made to a lens. The lens is taken out by removing the gasket 111 and the molds 112 and 113. The resultant lens is finished to a high quality lens by being annealed to remove strain caused by polymerization.

Incidentally, the plastic material 15 in the cavity 114 shrinks in polymerization and attracts the gasket 111 and molds 12 and 113 toward the inside of the cavity 114. When the attracting force is produced, the mold 112 on the left side in FIG. 3 is not moved by being restricted by the ring-shaped projection band 111c. Since the right mold 113 is not restricted, however, it can slide in the gasket 111. Thus, when the polymerized plastic material 115 shrinks, the mold 113 follows the shrinkage of the plastic material 115. As a result, a separation of the plastic material 15 from the molds 112 and 113 does not occur in polymerization.

Figure 7:
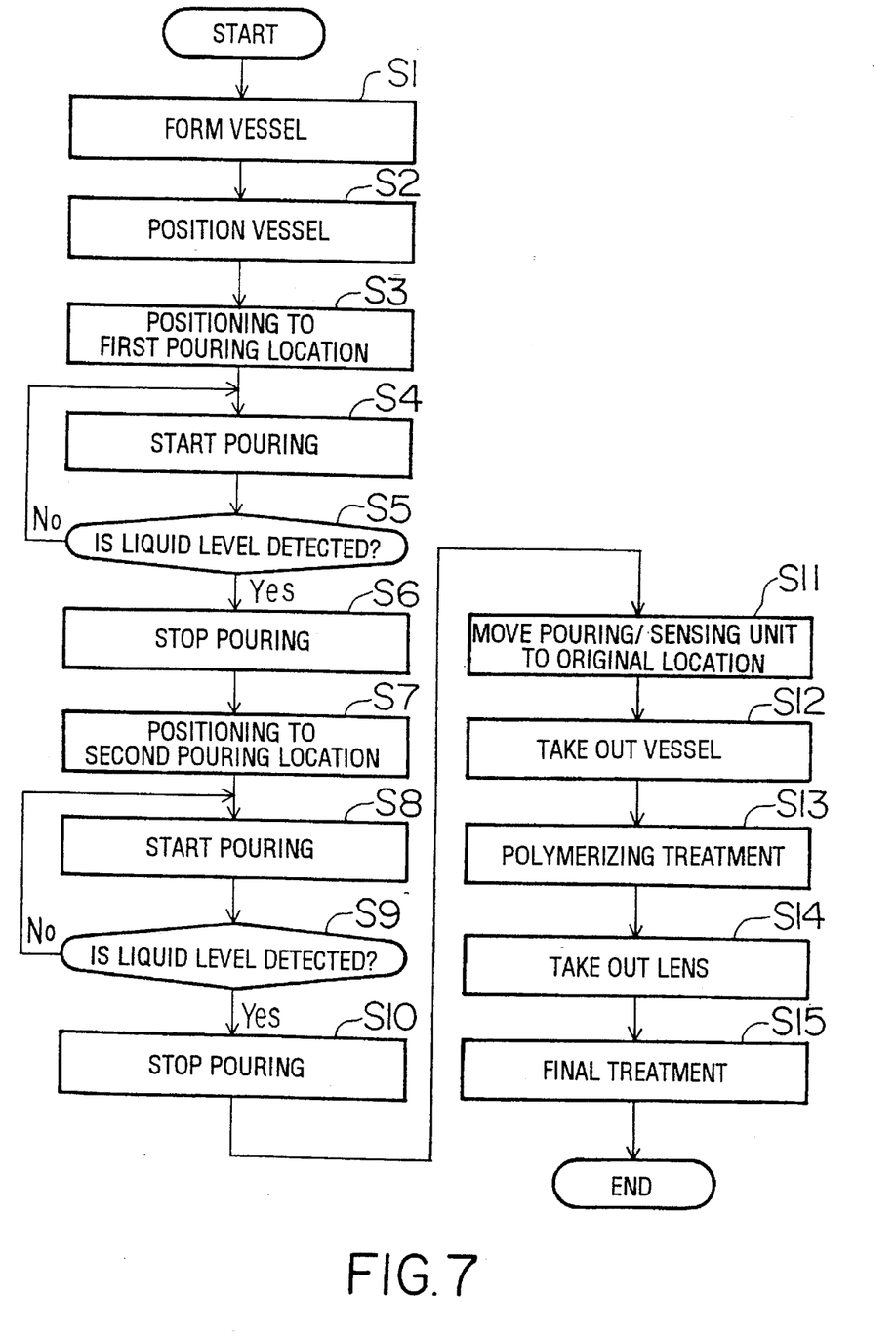
FIG. 7 is a flowchart showing a process of a pouring/filling job as a whole.

FIG. 7 is a flowchart showing a process of a pouring/filling job as a whole.

[S1] The cavity 114 is formed between the gasket 111 and molds 112 and 113 to thereby form the entire vessel 11.

[S2] The vessel 11 is located so that the pouring gate 111b is located at the predetermined position.

[S3] The motor 16 is driven and the pouring/sensing unit 12 is lowered from the original position and located at the first pouring position.

[S4] The pouring of the plastic material 15 is started from the pouring nozzle 13 into the cavity 114.

[S5] It is determined whether or not the tip 14a of the temperature sensor 14 has detected the liquid surface of the material 15, and if the sensor 14 detected it, the process goes to step S6, and if not, the process returns to step S4.

[S6] The pouring operation of the plastic material 15 is stopped.

[S7] The motor 16 is driven and the pouring/sensing unit 12 is lifted from the first pouring position and located at the second pouring position.

[S8] The pouring of the plastic material 15 is started from the pouring nozzle 13 into the pouring port 111a.

[S9] It is determined whether or not the tip 14a of the temperature sensor 14 has detected the liquid surface of the plastic material 15, and if the sensor 14 detected it, the process goes to step S10, and if not, the process returns to step S8.

[S10] The pouring operation of the plastic material 15 is stopped.

[S11] The pouring/sensing unit 12 is moved to return to the original position.

[S12] A seal is applied to the pouring port 111a and the vessel 11 is transferred from the position of the pouring job to the polymerizer.

[S13] The plastic material 15 is polymerized.

[S14] A lens is taken out by removing the gasket 111 and molds 112 and 113.

[S15] The resultant lens is annealed to remove strain caused by polymerization therefrom.

As described above, according to this embodiment, since the position of the liquid level of the plastic material 15 is detected making use of a temperature change of the temperature sensor 14, the plastic material 15 can be filled with a pinpoint accuracy without being restricted by the type of the plastic material 15, the material of the vessel 11, or the shape.

Note, according to the present invention, since the pouring port 111a is formed such that it expands upward from the pouring gate 111b of the gasket 111, the respective tips 13a and 14a of the pouring nozzle 13 and the temperature sensor 14 can be securely guided to the pouring gate 111b. Consequently, efficiency and accuracy can be improved in an automated pouring process.

Although this embodiment shows an example using the resin gasket 111, an adhesive tape may be applied around the molds 112 and 113. Further, this embodiment is applicable to fill any types of liquid in addition to a liquid for plastic lenses.

Although the temperature of the temperature sensor 14 is set to a temperature higher than that of the plastic material 15 in this embodiment, it may be set lower than the temperature of the plastic material 15 on the contrary.

Figure 8:
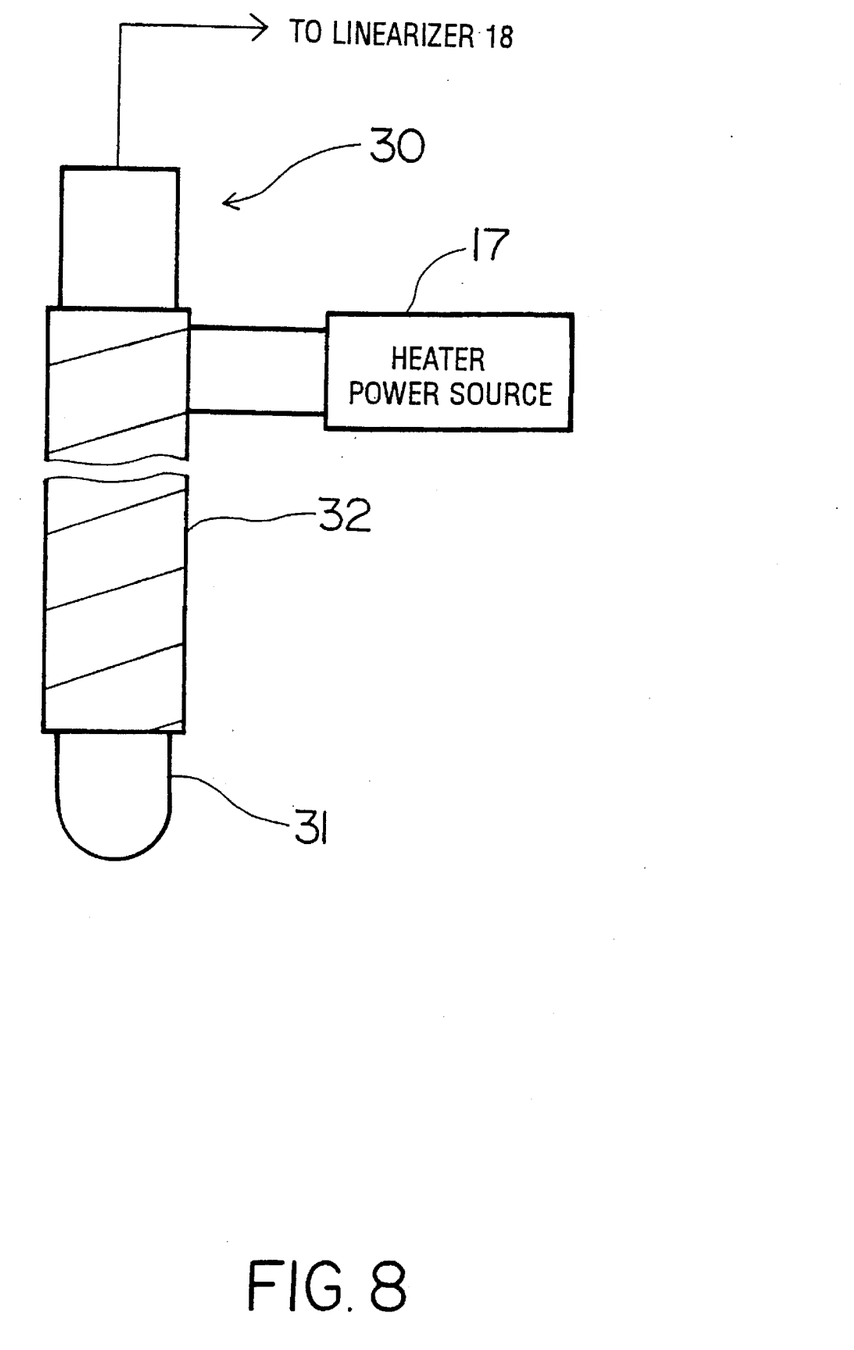
FIG. 8 is a view showing an example of another arrangement of the temperature sensor.

Although this embodiment shows an example using the temperature sensor 14 including the two thermocouples 142 and 143 disposed in the sheath 141, a temperature sensor 30 may be used which has a tape-shaped heat coil 32 wound around a bar-shaped thermal sensing portion 31 such as a thermocouple or the like as shown in FIG. 8. In this case, the output terminal of the thermal sensing portion 31 is connected to the linearizer 18 and the heater (heat coil) 32 thereof is connected to the heater power source 17.

As described above, according to the present invention, the thermal sensing portion of the temperature sensor is set and kept to a temperature different from that of a liquid, and the liquid is poured into the vessel. A change of an output from the temperature sensor is detected when the liquid surface comes into contact with the thermal sensing portion, and the filling of the liquid is stopped as it is determined that the liquid surface has reached a desired level. Thus, the liquid can be accurately poured into the vessel without being affected by the type of the liquid.

According to the present invention, the thermal sensing portion of the temperature sensor is set and kept to a temperature different from that of a lens material liquid, and the lens material liquid is poured into the cavity. A change of an output from the temperature sensor is detected when the surface of the lens material liquid comes into contact with the thermal sensing portion, and the filling of the lens material liquid is stopped as it is determined that the liquid surface has reached a desired level. Thus, the lens material liquid can be accurately filled without being affected by the dispersion of the volumes of the cavities caused by the degrees of lenses and the shapes of the lenses.

According to the present invention, a lens is manufactured in such a manner that the cavity is formed between the casting gasket and the two molds attached thereto, the thermal sensing portion of the temperature sensor is set and kept to a temperature different from that of a lens material liquid and located on the surface to which the material is filled, the lens material liquid is poured into the vessel, a change of an output from the temperature sensor is detected when the surface of the lens material liquid comes into contact with the thermal sensing portion, the filling of the liquid is stopped when it is determined that the liquid surface has reached a desired level, and then the gasket filled is put into the polymerizer to polymerize the lens material liquid. Thus, the lens material liquid can be accurately filled into the cavity and a high quality lens can be manufactured.

I claim:

1. A lens material liquid filling method of controlling an amount of a lens material liquid to be filled into a cavity, comprising the steps of:

setting and keeping a thermal sensing portion of a temperature sensor having a protection sheath made of stainless steel to a temperature different from that of said lens material liquid which is selected from polyurethane, allylic, acrylic monomers, and combinations thereof;

pouring said lens material liquid into a vessel;

detecting a change of an output from said temperature sensor when the surface of said lens material liquid comes into contact with said thermal sensing portion; and stopping the filling of said lens material liquid when it is determined that said liquid surface has reached a predetermined level.

2. A lens material liquid filling method according to claim 1, wherein said temperature sensor comprises two thermocouples, an electric current is supplied to one of the thermocouples so that said one of the thermocouples is set and kept to said predetermined temperature by being heated.

3. A lens material liquid filling method according to claim 1, further comprising a heat coil, wherein said thermal sensing portion is set and kept to said predetermined temperature by said heat coil.

4. A lens material liquid filling method according to claim 1, wherein the temperature of said lens material liquid is set to −10° C. to 20° C. and the temperature of said thermal sensing portion is set to 30° C. to 90° C.

5. A lens material liquid filling method according to claim 1, comprising the steps of:

executing first filling operation after disposing a filling nozzle and said temperature sensor at a first pouring position;

filling said lens material liquid to said first pouring position;

lifting said filling nozzle and said temperature sensor to a second pouring position; and filling said lens material liquid to said second pouring position.

6. A lens material liquid filling method according to claim 5, wherein a filling speed to said second pouring position is set lower than that to said first pouring position.

7. A method of manufacturing a lens by pouring a lens material liquid into a cavity, comprising the steps of:

forming a cavity in a casting gasket to which two molds are attached;

setting and keeping a thermal sensing portion of a temperature sensor to a temperature different from that of said lens material liquid;

disposing a filling nozzle for the lens material liquid and said temperature sensor at a first pouring position;

pouring said lens material liquid into the cavity until said temperature sensor detects the first pouring position by means of changing of the temperature of the thermal sensing portion when the surface of said lens material liquid comes into contact with said thermal sensing portion;

lifting said filling nozzle and said temperature sensor to a second pouring position;

pouring said lens material liquid into said cavity until said temperature sensor detects said second pouring position; and putting said gasket filled with the liquid into a polymerizer to polymerize said lens material liquid in said polymerizer.

8. A method of manufacturing a lens according to claim 7, wherein a filling speed to said second pouring position is set lower than that to said first pouring position.

* * * * *